United States Patent [19]
Herold

[11] Patent Number: 5,553,359
[45] Date of Patent: Sep. 10, 1996

[54] FASTENER FOR CONVEYOR BELTS

[75] Inventor: Wolfgang Herold, Offenbach am Main, Germany

[73] Assignee: Mato Maschinen-und Metallwarenfabrik Curt Matthaei GmbH & Co. KG, Offenbach, Germany

[21] Appl. No.: 254,292

[22] Filed: Jun. 3, 1994

[30] Foreign Application Priority Data

Jun. 7, 1993 [DE] Germany .......................... 43 18 836.2

[51] Int. Cl.⁶ ...................................................... F16G 3/09
[52] U.S. Cl. ............................................. 24/33 P; 24/33 R
[58] Field of Search ........................... 24/33 R, 33 F, 24/33 P, 33 B, 33 V, 33 M, 31 F, 31 H; 411/501; 198/844.2; 474/253, 255, 257

[56] References Cited

U.S. PATENT DOCUMENTS

| | | | |
|---|---|---|---|
| 399,962 | 3/1989 | Avery | 24/33 B |
| 3,176,358 | 4/1965 | Leflon | 24/33 B |
| 3,405,594 | 10/1968 | Falcioni | 411/501 |
| 3,962,754 | 6/1976 | Stolz | 24/33 B |
| 4,060,877 | 12/1977 | Schick | 24/33 B |
| 4,582,505 | 4/1986 | Stolz | 24/33 B X |
| 4,671,403 | 6/1987 | Schick | 198/844. |
| 4,815,587 | 9/1989 | Musil | 24/33 B X |
| 4,996,750 | 3/1991 | Musil | 24/33 B X |
| 5,182,933 | 2/1993 | Schick | 24/33 P X |
| 5,234,101 | 8/1993 | Herold | 198/844.2 |

FOREIGN PATENT DOCUMENTS 2377560  8/1978  France .
4110818  9/1972  Germany .

*Primary Examiner*—James R. Brittain
*Attorney, Agent, or Firm*—Price, Heneveld, Cooper, DeWitt & Litton

[57] ABSTRACT

A unique fastener is provided for conveyor belts and the like, and includes a body element with a U-shaped cross section, containing at least one generally semicircular coupling eyelet, and a fastening leg with an entrance slot for at least one fastening pin. The fastening pin is peg-shaped, and has two blunt ends, at least one of which is upset to retain the fastening pin in the body element.

20 Claims, 3 Drawing Sheets

FASTENER FOR CONVEYOR BELTS

BACKGROUND OF THE INVENTION

The present invention concerns a fastening element for conveyor belts and the like, and in particular, to a fastener with a body element, U-shaped in cross section, containing at least one generally semicircular coupling eyelet and fastening legs with an entry opening for at least one fastening pin.

U-shaped belt fasteners are generally well known in the art. They are connected to each other with a coupling bar that reaches across the comb-like coupling eyelets. Such fasteners encompass each end of the conveyor belt with their U-shaped body element, and in this position are fastened to the conveyor belt ends with staples or rivets. Staples typically extend relatively far beyond the main body of the fastener after they are attached, and the same is also true for rivet heads when using rivets.

Furthermore, when rivets are used for fastening the connecting elements at the ends of conveyor belts, it is common practice to use relatively long pointed rivets, which are shortened to the required length after passing through the belt end and the associated fastening legs. Consequently, all rivets have to be cut off by hand after installation. This is both labor intensive and time consuming, and therefore expensive.

SUMMARY OF THE INVENTION

One objective of the present invention is to create a special fastener with a matching unique fastening pin, which makes the attachment of the fasteners to the belt ends less complicated and less expensive.

The present invention solves this problem by designing a fastening pin that is peg shaped and has two blunt ends. One of the two ends of the peg-shaped fastening pin may have a rivet head. The other end is to remain preferably flat and, according to the invention, is pressed directly through the belt end. On the other side of the belt, the fastening pin enters the applicable opening in the fastening leg, and there is immediately peened or pressed into place. For instance, this can occur with a punch that slightly expands the blunt end of the fastening pin, so that the end is anchored tightly and securely in the opening or the entrance slot of the fastening legs.

Further characteristics of the invention will be further understood and appreciated by reference to the following claims in connection with the description and the drawings.

The present invention is described below in more detail with respect to a production sample, as illustrated in the drawings.

DETAILED DESCRIPTION OF THE PREFERRED EMBODIMENTS

Figure 1:
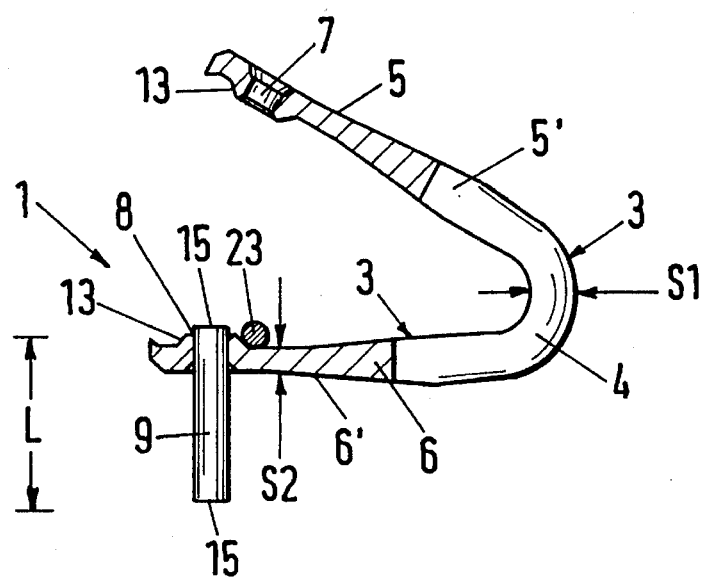
FIG. 1: A longitudinal section of a fastener before use.

A fastener 1 for conveyor belts 2 consists of a body element 3, which contains at least one and, preferably as in this example, two generally semicircular coupling eyelets 4, and two fastener legs 5 and 6 with apertures or entrance slots 7, 8 for receiving a fastening pin 9.

Figure 2:
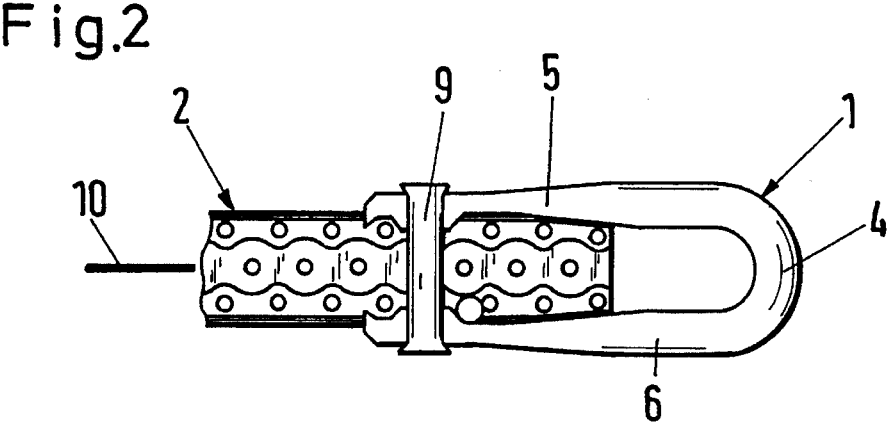
FIG. 2: A cross section along the line II—II in FIG. 3.

The coupling eyelets 4 have a generally U-shaped side configuration and cross section. The material strength S1 of the coupling eyelets 4 in radial direction, at least across the largest part of its circumference, is at least twice as large as the material strength S2 of the fastener legs 5, 6 in the area of their entrance slots 7, 8. FIGS. 1 and 2 best show this feature most clearly.

Because of the differences in material strength in the area of the coupling eyelets 4 and the fastening legs 5, 6, the cross section of the fastening legs 5 6, perpendicular to the conveyor belt surface, 10 is wedge shaped. To achieve a gradual transition from the fastening legs 5, 6, to the coupling eyelets 4, the cross section of the fastening legs 5, 6 diverges from the entrance slots 7, 8 to the coupling eyelets 4.

In the illustrated structure, two coupling eyelets 4 each form, together with their applicable fastening legs 5, 6, a fastener 1, having a one-piece construction. Corresponding to the gap 11 between the coupling eyelets 4, preferably both fastening legs 5, 6 display gradually diminishing indentation 12 (FIG. 3) within the continuation of the gap 11. Ring-shaped bosses 13 surround each entrance slot 7, 8 on the side facing the conveyor belt, and each entrance slot 7, 8 also has on the outside of the fastening legs 5', 6' or 5, 6 a tapered or conical indentation 7a or 8a, as shown clearly in FIG. 4.

Figure 4:
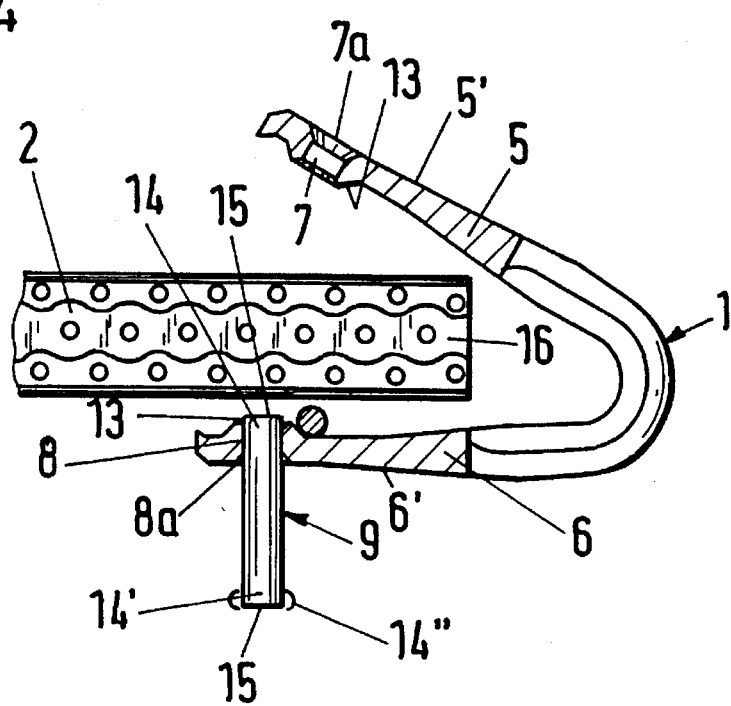
FIG. 4: An enlarged section or side view of the end of a conveyor belt with a fastener before it is fastened.

The fasting pins 9, used for attaching the fasteners 1 to the conveyor belt 2, are peg shaped, of a defined gauge block (L), and possess two blunt ends 14 or 14', as shown in the production sample illustrated in the diagrams noted above. It is also possible to place a rivet head 14" on the other end 14". Nevertheless, it is advantageous for both sides 14, 14' to have flat faces 15, as shown in FIGS. 1 and 4.

Figure 5:
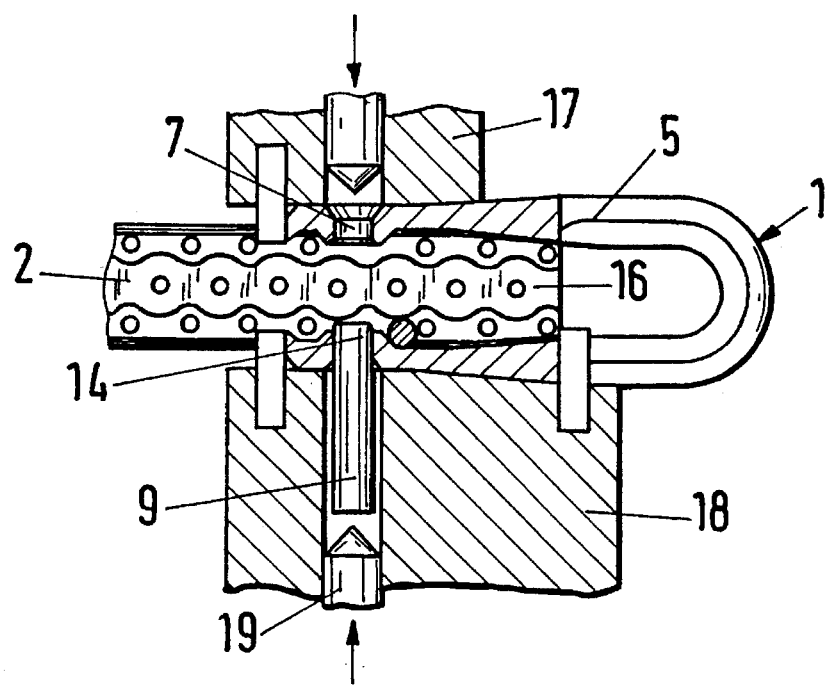
FIG. 5: A cross section view like that of FIG. 4, together with the tool components, before the penetration of the peg-shaped fastening pin through the conveyor belt.
Figure 6:
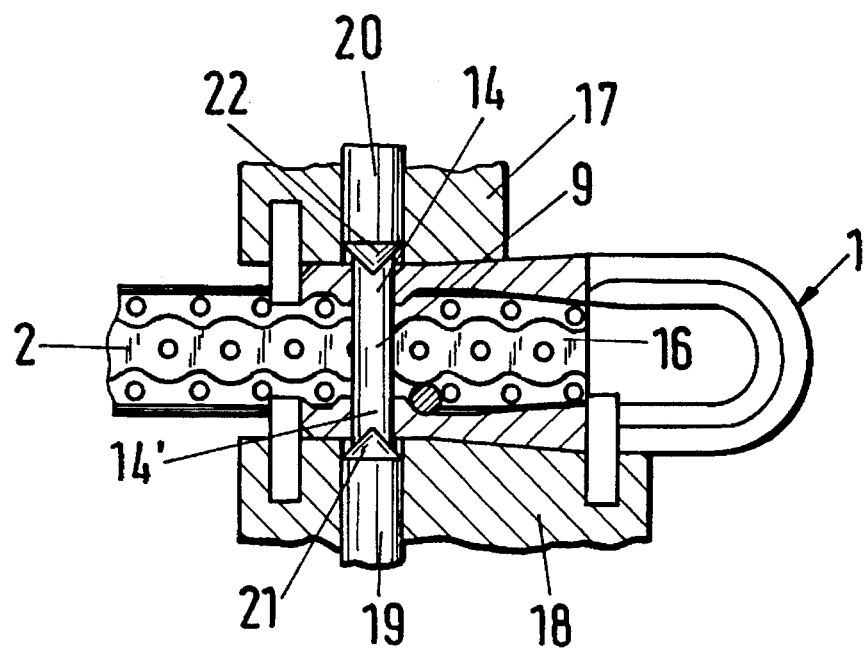
FIG. 6: A cross section view like that of FIG. 5, immediately before the ends of the fastening pins are pressfitted.

The attachment of the fastener 1 to the end 16 of the conveyor belt 2 is preferably achieved with an upper tool 17 and a lower tool 18, as shown in FIGS. 5 and 6. In this operation, the upper tool 17 presses the fastening leg 5 to the belt end 16, until the entrance slot 7 in the fastening leg 5 aligns with the peg-shaped fastening pin 9, which is positioned in the entrance slot 8 of the other fastening leg 6. Then, a punch 19 in the lower tool 18 forces the peg-shaped fastening pin 9 through the conveyor belt 2, until its leading end 14 is located in the entrance slot 8 of the other fastening leg 6. The upper tool 17 also has a punch 20, which is aligned with the punch 19 of the lower tool 18. Both of the punches or rams 19 and 20 can be moved independently from one another, as is indicated by the arrows in FIG. 5.

As soon as the fastening pin 9 has penetrated the conveyor belt 2 in the prescribed manner, the two rams 19, 20 exert force on the blunt ends 14 and 14' of the fastening pin 9, and anchor or upset the ends 14 and 14' in the entrance slots 7 and 8. Consequently, the ends 14 and 14' of fastening pin 9 also fill the conical indentations 7a or 8a of the entrance slots 7 and 8. If the punch ends 19 and 20 contain points 20 or 21 (FIG. 6), then corresponding impressions will form on the faces 15 of the fastening pins 9.

Figure 7:
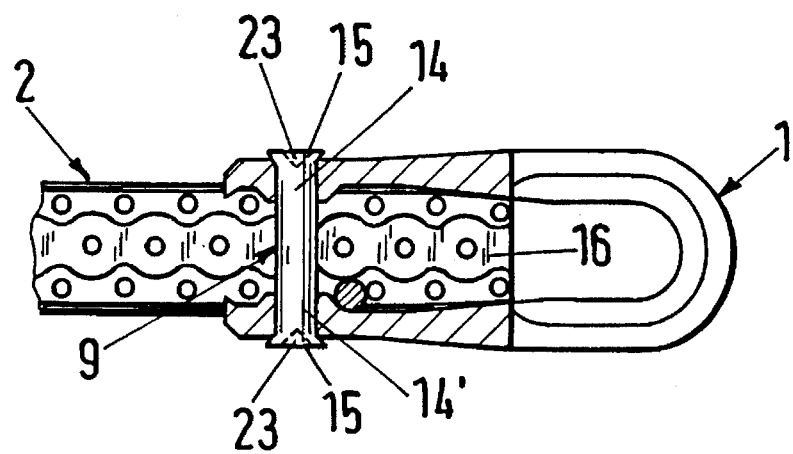
FIG. 7: A cross section or side view like those in FIGS. 4–6 of the conveyor belt end with an attached fastener.

Depending on the length of the fastening pin 9, it either does not project at all from the outer contour of the fastener 1 after the ends 14 and 14' are pressed or upset as is shown in FIG. 2, or the ends 14, 14' protrude only slightly as indicated in FIG. 7. Preferably, any projection should not exceed a maximum of 0.2 mm.

According to one production sample of the present invention, the fastening pin 9 does not have a raised rivet head, either in its original condition, or after the attachment is completed.

Furthermore, it is important to note, that no taper or spike is included in the design of the fastening pin 9 for easing the penetration of the fastening pin 9 into the conveyor belt 2.

Finally it is advantageous, if both ends of the peg-shaped fastening pin 9 are blunt, because that facilitates ease of production and assembly, especially, since the penetration through the conveyor belt already proceeds with the aid of the point 21 of the punch 19, used for expanding the fastening pin ends.

Figure 3:
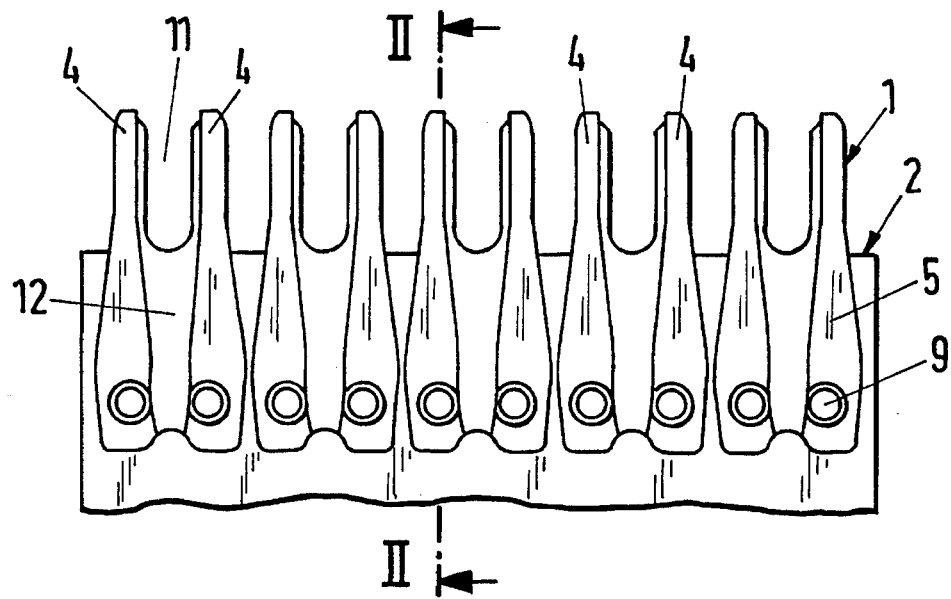
FIG. 3: A top view of a conveyor belt with several fasteners.

As is common practice, several fasteners 1 are jointed together into an installation unit with a wire 23 (FIG. 1) or the like for improved utility, as seen in FIG. 3.

It is to be understood that the present invention is not limited to the production sample illustrated in the diagrams, and that alterations and modifications are possible without deviating from the essence of this invention. For instance, fastening pins 9 with blunt ends 14, 14' can also be used for attaching plate shaped fasteners to conveyor belts, and there are further alterations possible as to the precise form and design of the fastener(s) 1 and the associated tools. Fastening pin 9 may have blunt ends 14, 14', such that blunt end 14 is forced through the belt end 16, with the blunt ends 14, 14' pressed into entrance slots 7 or 8, so as to be securely anchored in place. The diameter of the entrance slot 7, into which the end 14 of the fastening pin 9 is inserted, is about 0.1 mm larger than the diameter of the other entrance slot 8. Only a slight increase of the outer diameter occurs during the expanding or pressfitting of the pin ends 14 or 14'.

Preferably, the peg-shaped fastening pin 9 is constructed from a high tensile material.

In the foregoing description, it will be readily appreciated by those skilled in the art that additional modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A fastener for conveyor belts and the like, comprising:
   a body element having a generally U-shaped side configuration which defines a coupling eyelet for receiving a connecting pin therein; said body element including a pair of legs shaped for positioning on opposite sides of an associated belt end, wherein each of said legs has a fastener aperture therethrough positioned such that the fastener apertures on said legs are mutually aligned when said body element is clenched on the belt end;
   a rigid fastening pin having a cylindrical sidewall, with one end portion thereof closely received and frictionally retained in the fastener aperture of one of said legs to interconnect the same in a selected pre-clenched condition; said fastening pin having a blunt end associated with said one end portion which when said body element is clenched on the belt end is driven through an adjacent previously unapertured portion of the belt end, and closely received in the fastener aperture of the other one of said legs, and subsequently upset to positively interconnect the same.

2. A fastener as set forth in claim 1, wherein:
said fastening pin blunt end has a flat planar face oriented generally perpendicular to said sidewall.

3. A fastener as set forth in claim 2, wherein:
said fastener aperture on said other leg has an inwardly tapered outer end to receive an upset end of said fastening pin therein.

4. A fastener as set forth in claim 3, wherein:
said other leg includes a ring-shaped boss positioned concentric with said fastener aperture thereon, and protruding inwardly thereof.

5. A fastener as set forth in claim 4, wherein:
said coupling eyelet has a first predetermined material strength in a radial direction; and
said fastening legs each have a second predetermined material strength adjacent said fastener aperture, which has a measure that is substantially one-half of that of said first material strength.

6. A fastener as set forth in claim 5, wherein:
said legs each have a wedge shaped side elevational configuration.

7. A fastener as set forth in claim 6, wherein:
said fastening pin has a predetermined length that is accurately cut to an associated gauge block.

8. A fastener as set forth in claim 7, wherein:
said fastening pin is constructed from a high tensile material.

9. A fastener as set forth in claim 8, wherein:
said fastening pin includes a head at an end thereof opposite said blunt end.

10. A fastener as set forth in claim 9, wherein:
said fastening pin includes a second end opposite said blunt end which is also blunt.

11. A fastener as set forth in claim 10, wherein:
said blunt second end of said fastening pin has a flat planar face oriented generally perpendicular to said sidewall.

12. A fastener as set forth in claim 1, wherein:
said fastener aperture of said other leg has an inwardly tapered outer end to receive an upset end of said fastening pin therein.

13. A fastener as set forth in claim 1, wherein:
said other leg includes a ring-shaped boss positioned concentric with said fastener aperture thereon, and protruding inwardly thereof.

14. A fastener as set forth in claim 1, wherein:
said coupling eyelet has a first predetermined material strength in a radial direction; and
said fastening legs each have a second predetermined material strength adjacent said fastener aperture, which has a measure that is substantially one-half of that of said first material strength.

15. A fastener as set forth in claim 1, wherein:
said legs each have a wedge shaped side elevational configuration.

16. A fastener as set forth in claim 1, wherein:
said fastening pin has a predetermined length that is accurately cut to an associated gauge block.

17. A fastener as set forth in claim 1, wherein:
said fastening pin is constructed from a high tensile material.

18. A fastener as set forth in claim 1, wherein:
said fastening pin includes a head at an end thereof opposite said blunt end.

19. A fastener as set forth in claim 1, wherein:
said fastening pin includes a second end opposite said blunt end which is also blunt.

20. A fastener as set forth in claim 19, wherein:
said blunt second end of said fastening pin has a flat planar face oriented generally perpendicular to said sidewall.

\* \* \* \* \*